United States Patent
Kim et al.

(10) Patent No.: US 8,823,616 B2
(45) Date of Patent: Sep. 2, 2014

(54) LIQUID CRYSTAL DISPLAY DEVICE AND METHOD OF DRIVING THE SAME

(75) Inventors: Hyoung-wook Kim, Busan (KR); Min-sung Choi, Cheonan-si (KR); Seung-ho Baek, Cheonan-si (KR); Sang-youn Kim, Daegu (KR); Byoung-haw Park, Cheonan-si (KR); Ji-eun Jang, Asan-si (KR); Cheal-gi Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 1355 days.

(21) Appl. No.: 11/932,946

(22) Filed: Oct. 31, 2007

(65) Prior Publication Data

US 2008/0239184 A1 Oct. 2, 2008

(30) Foreign Application Priority Data

Mar. 27, 2007 (KR) .................. 10-2007-0029891

(51) Int. Cl.
 *G09G 3/36* (2006.01)
 *G02F 1/139* (2006.01)

(52) U.S. Cl.
 CPC ...... *G09G 3/3696* (2013.01); *G09G 2320/0233* (2013.01); *G02F 1/1393* (2013.01); *G09G 2320/0223* (2013.01)
 USPC ............... 345/87; 345/88; 345/89; 345/204; 345/102; 345/100

(58) Field of Classification Search
 USPC .............................. 345/87, 204, 690
 See application file for complete search history.

(56) References Cited

U.S. PATENT DOCUMENTS

| 5,719,591 | A * | 2/1998 | Callahan et al. ............... 345/98 |
| 6,738,120 | B1 * | 5/2004 | Song et al. ................... 349/139 |
| 6,747,617 | B1 * | 6/2004 | Kawashima ................... 345/76 |
| 7,145,527 | B2 * | 12/2006 | Moon ......................... 345/75.2 |
| 2003/0058208 | A1 * | 3/2003 | Kawamura et al. ............. 345/87 |

FOREIGN PATENT DOCUMENTS

| KR | 1020010053782 A | 7/2001 |
| KR | 1020030008692 A | 1/2003 |
| KR | 1020060071016 A | 6/2006 |

* cited by examiner

*Primary Examiner* — Grant Sitta
(74) *Attorney, Agent, or Firm* — Cantor Colburn LLP

(57) ABSTRACT

A liquid crystal display device includes; gate lines disposed on a display region, data lines disposed on the display region, wherein the data lines intersect with, and are insulated from, the gate lines, a gate driver which drives the gate lines, a plurality of data drivers which generate a data voltage from an input power source voltage and supply the data voltage to the data lines, and a power source voltage supplying unit which supplies different power source voltages to each of the data drivers according to a distance of each data driver from the gate driver.

14 Claims, 13 Drawing Sheets

LIQUID CRYSTAL DISPLAY DEVICE AND METHOD OF DRIVING THE SAME

This application claims priority to Korean Patent Application No. 10-2007-0029891, filed on Mar. 27, 2007, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display ("LCD") device and a method of driving the same, and more particularly, to an LCD device and a method of driving the same, which has improved brightness uniformity.

2. Description of the Related Art

An LCD device includes a first substrate formed with a plurality of thin film transistors ("TFTs"), a second substrate opposite to the first substrate, and a liquid crystal layer disposed between the first and second substrate.

On the first substrate, pixels are disposed at the intersections of gate and data lines. Each pixel is connected to one of the TFTs. When a gate signal, e.g., a gate-on voltage, is applied to the gate lines and the TFT is turned on, the pixel is charged with a data voltage supplied through the data lines.

The gate-on voltage is applied to the gate line through a gate driver. The greater the distance is between the gate driver and the pixel, the more the applied gate-on voltage is delayed by resistance of the gate line.

Further, the delay of the gate-on voltage causes a decrease in the charging efficiency of the pixels as they are positioned farther away from the gate driver. This inequality in charging efficiency results in a non-uniform brightness with distance from the gate driver.

BRIEF SUMMARY OF THE INVENTION

The present invention provides a liquid crystal display ("LCD") device having improved brightness uniformity.

The present invention also provides a method of driving an LCD device having improved brightness uniformity.

Exemplary embodiments of the present invention provide an LCD device including; gate lines disposed on a display region, data lines disposed on the display region, the data lines intersect with, and are insulated from, the gate lines, a gate driver which drives the gate lines, a plurality of data drivers which generate a data voltage from an input power source voltage and supply the data voltage to the data lines, and a power source voltage supplying unit which supplies different power source voltages to each data driver according to a distance of each data driver from the gate driver.

According to an exemplary embodiment of the present invention, the voltage level of the power source voltage applied to individual data drivers of the plurality of data drivers increases as those individual data drivers are disposed at an increasing distance from the gate driver.

According to an exemplary embodiment of the present invention, the power source voltage supplying unit includes; a power source voltage generator, and a power source voltage adjuster which is disposed between the power source voltage generator and the plurality of data drivers, and adjusts the power source voltage to be applied to each of the plurality of data drivers.

According to an exemplary embodiment of the present invention, the power source voltage adjuster includes a resistor string.

According to an exemplary embodiment of the present invention, the gate driver includes first gate driver and a second gate driver, and the first and second gate drivers are disposed on substantially opposite sides of the display region.

In one exemplary embodiment an LCD device includes; a first substrate which includes; gate lines disposed on a display region, and data lines disposed on the display region, wherein the data lines intersect with, and are insulated from, the gate lines, a second substrate disposed substantially opposite to the first substrate, a liquid crystal layer disposed between the first substrate and the second substrate, a gate driver which drives the gate lines, a plurality of data drivers including, a first data driver disposed a first distance away from the gate driver, and a second data driver disposed a second distance away from the gate driver, wherein the second distance is larger than the first distance, and a power source voltage supplying unit which supplies different power source voltages to the first data driver and the second data driver.

According to an exemplary embodiment of the present invention, the power source voltage supplying unit supplies the second data driver with a greater power source voltage than the first data driver.

According to an exemplary embodiment of the present invention, the power source voltage supplying unit includes; a power source voltage generator, and a power source voltage adjuster which adjusts the power source voltage to be applied to each data driver.

According to an exemplary embodiment of the present invention, the power source voltage adjuster includes a resistor string.

According to an exemplary embodiment of the present invention, the liquid crystal layer is a vertical alignment mode liquid crystal layer.

According to an exemplary embodiment of the present invention, the first substrate further includes a pixel electrode including a first region partitioning member, and the second substrate includes a common electrode including a second region partitioning member.

According to an exemplary embodiment of the present invention, the gate driver is formed on the first substrate.

According to an exemplary embodiment of the present invention, the gate driver includes a first gate driver and a second gate driver, and the first and second gate drivers are disposed on substantially opposite sides of the display region.

In one exemplary embodiment an LCD device includes; a first substrate which includes; gate lines disposed on a display region, and data lines disposed on the display region, wherein the data lines intersect with, and are insulated from, the gate lines, a second substrate disposed substantially opposite to the first substrate, a liquid crystal layer disposed between the first substrate and the second substrate, a gate driver which drives the gate lines, and a plurality of data drivers including, a first data driver which drives a first data line and is disposed a first distance away from the gate driver, and a second data driver which drives a second data line and is disposed a second distance away from the gate driver, wherein the second distance is larger than the first distance, and the first data driver and the second data driver generate different data voltages from each other, and apply the different data voltages to the corresponding data lines, respectively.

According to an exemplary embodiment of the present invention, the second data driver generates a greater data voltage than the first data driver.

In one exemplary embodiment a method of driving an LCD device includes; supplying different power source voltages to a plurality of data drivers, wherein the power source voltages differ according to the data driver's distance from the gate driver, and generating a data voltage from the power source voltage input to each data driver, and applying the data voltage to a data line from the corresponding data driver.

According to an exemplary embodiment of the present invention, the voltage level of the power source voltage applied to individual data drivers of the plurality of data drivers increases as those individual data drivers are disposed at an increasing distance from the gate driver.

BRIEF DESCRIPTION OF THE DRAWINGS

The above and/or other aspects, features and advantages of the present invention will become apparent and more readily appreciated from the following description of the exemplary embodiments, taken in conjunction with the accompanying drawings, in which.

DETAILED DESCRIPTION OF THE INVENTION

Figure 1:
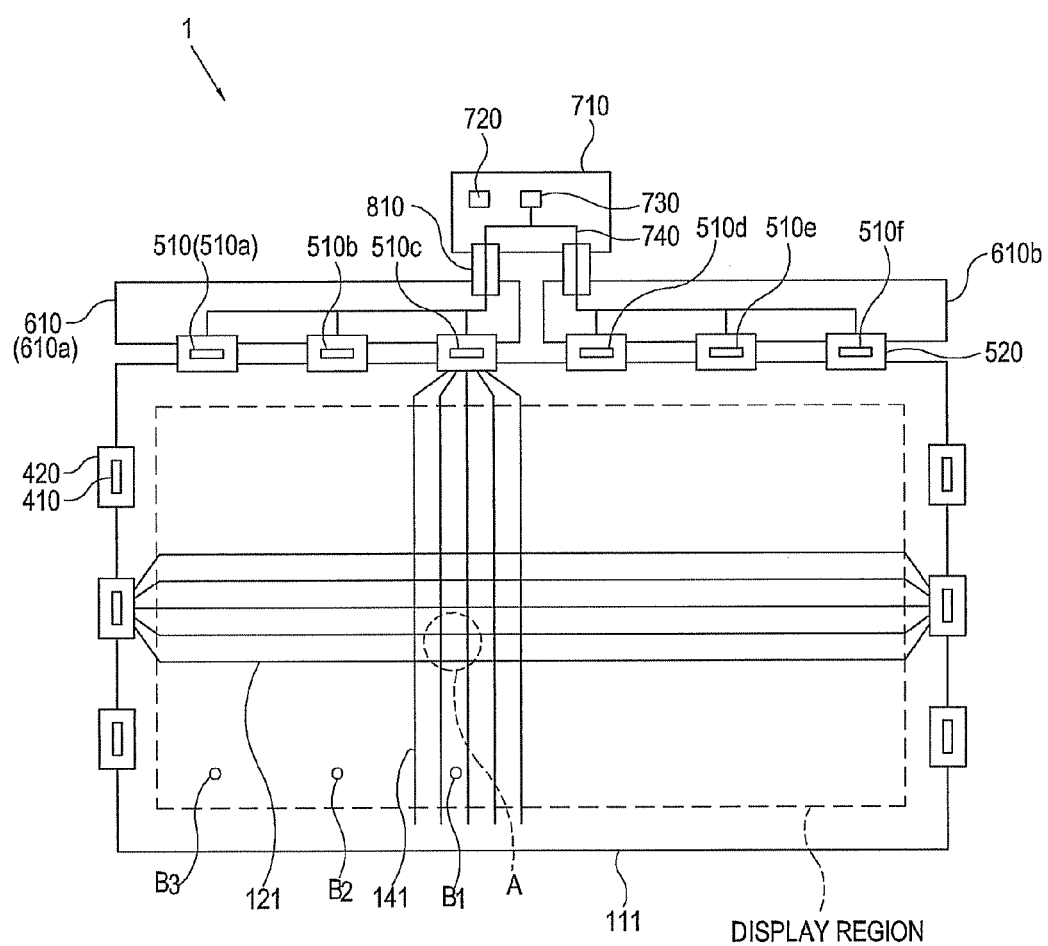
FIG. 1 is a top plan view layout of a first exemplary embodiment of a liquid crystal display ("LCD") device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

A first exemplary embodiment of a liquid crystal display ("LCD") device according to the present invention will be described with reference to FIGS. 1 through 3.

Figure 2:
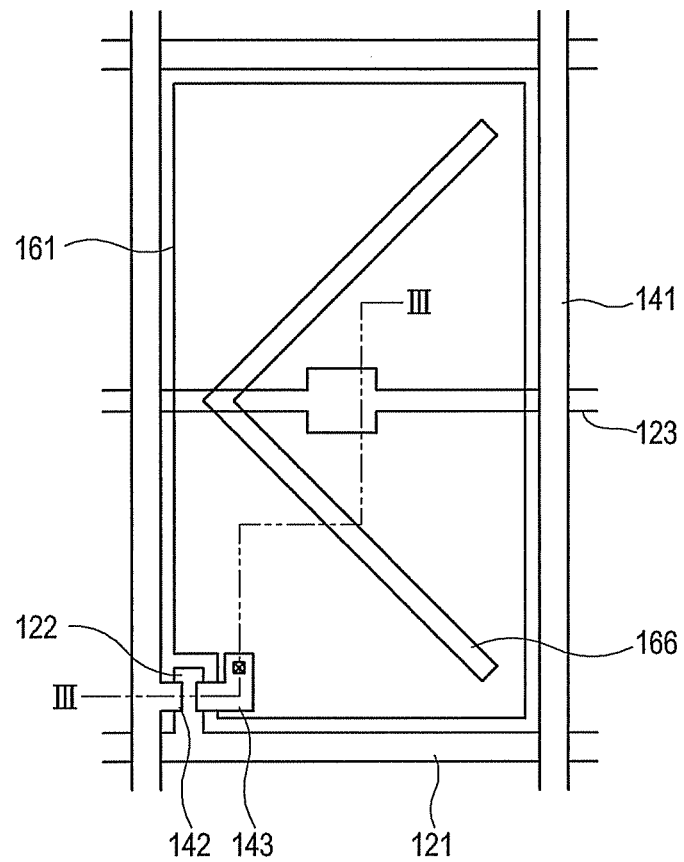
FIG. 2 is an enlarged view of section "A" of FIG. 1.
Figure 3:
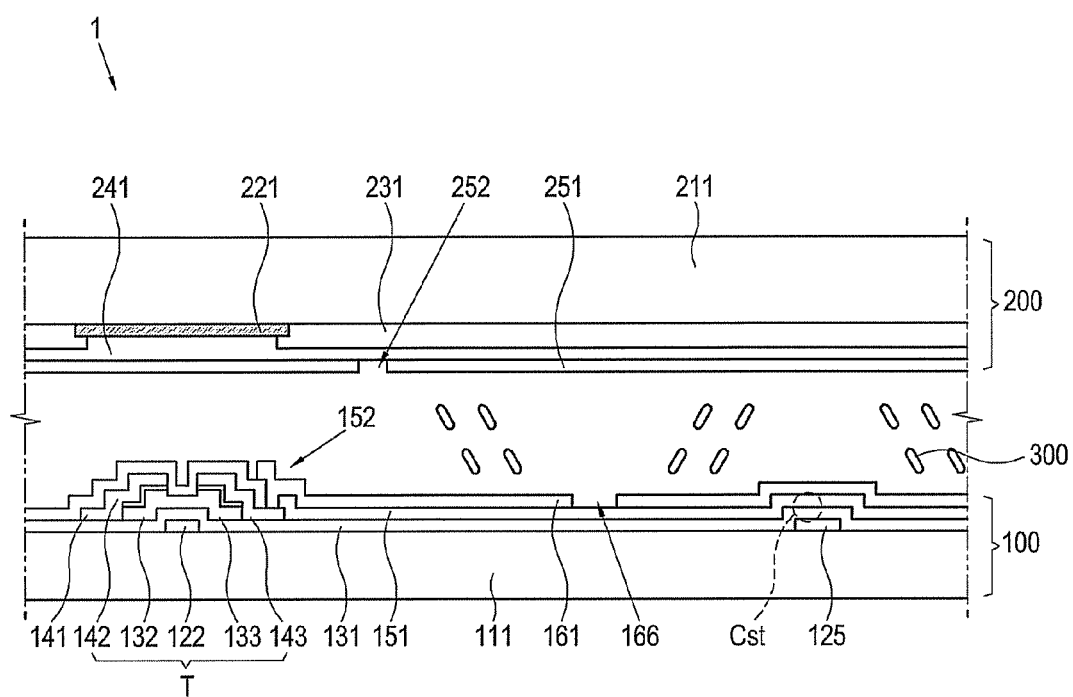
FIG. 3 is a cross-sectional view taken along line III-III of FIG. 2.

Referring to FIGS. 1 and 3, an LCD device 1 includes a first substrate 100, a second substrate 200, a liquid crystal layer 300 disposed between the first and second substrates 100 and 200, a gate driver 410 provided along opposing edges of the first substrate 100, a data driver 510 provided along a top edge of the first substrate 100, a data circuit board 610 connected to the data driver 510, and a control circuit board 710.

Referring to FIG. 1, the gate driver 410 and the data driver 510 are mounted on flexible members 420 and 520, respectively. Furthermore, a flexible member 810 connects the data circuit board 610 and the control circuit board 710. The control circuit board 710 includes a timing controller 720 and a DC/DC converter (or a power source voltage generator) 730 mounted thereon. A power source voltage AVDD is generated in the DC/DC converter 730 and applied to the data driver 610 through a wiring line 740.

Below, the first substrate 100 will be described with reference to FIGS. 2 and 3.

Gate wiring is formed on a first insulating substrate 111. In one exemplary embodiment the gate wiring may be made of metal as a single layer or in alternative exemplary embodiments it may be formed of multiple layers. The gate wiring includes a gate line 121 placed within a display region and arranged in a substantially horizontal direction, a gate electrode 122 extended from the gate line 121, and a storage electrode line 123 arranged substantially in parallel with the gate line 121.

In the present exemplary embodiment opposite ends of the gate line 121 are connected to the gate driver 410. A gate signal, e.g., a gate-on voltage and or gate-off voltage, is applied to the gate line 121 through the gate driver 410.

The gate wiring is substantially covered with a gate insulating layer 131. Exemplary embodiments of the gate insulating layer 131 include silicon nitride SiNx or other similar substances.

A semiconductor layer 132, exemplary embodiments of which include amorphous silicon or other similar materials, is formed on the region of the gate insulating layer 131 disposed above the gate electrode 122. An ohmic contact layer 133, exemplary embodiments of which may be made of n+ hydrogenated amorphous silicon highly doped with n-type impurities, is formed on the semiconductor layer 132. The ohmic contact layer 133 is either removed or not formed in a channel region between a source electrode 142 and a drain electrode 143 to be described in more detail below.

Data wiring is formed on the ohmic contact layer 133 and the gate insulating layer 131. Similar to the gate wiring, in one exemplary embodiment the data wiring may be made of a single layer of metal or in alternative exemplary embodiments the data wiring may be made from multiple layers. The data wiring includes a data line 141 which is arranged in a substantially vertical direction and intersects the gate line 121. A pixel may be formed in the region of intersection of the data line 141 and the gate line 121. A source electrode 142 branches from the data line 141 and extends along the ohmic contact layer 133, and a drain electrode 143 which is separated from the source electrode 142 extends along the ohmic contact layer 133 substantially opposite to the source electrode 142.

An end part of the data line 141 is connected to the data driver 510, and a data voltage is applied to the data line 141 through the data driver 510.

A passivation layer 151 is formed on the data wiring and the portion of the semiconductor layer 132 exposed between the data wiring, e.g., the source and drain electrodes 142 and 143, respectively. The passivation layer 151 is formed with a contact hole 152 through which the drain electrode 143 is exposed.

The gate electrode 122, the gate insulating layer 131, the semiconductor layer 132, the ohmic contact layer 133, the source electrode 142 and the drain electrode 143 form an exemplary embodiment of a thin film transistor ("TFT").

A pixel electrode 161 is formed on the passivation layer 151. In one exemplary embodiment the pixel electrode 161 is made of a transparent conductive material, exemplary embodiments of which include indium tin oxide ("ITO"), indium zinc oxide ("IZO") or other similar materials. The pixel electrode 161 is connected to the drain electrode 143 through the contact hole 152. In one exemplary embodiment the pixel electrode 161 is formed with a region partitioning member such as a pixel electrode cutting pattern 166. This pixel electrode cutting pattern 166 may also be referred to as an aperture.

Together with another region partitioning member, such as a common electrode cutting pattern 252 (to be described later), the pixel electrode cutting pattern 166 of the pixel electrode 161 divides the liquid crystal layer 300 into a plurality of regions. Alternative exemplary embodiments include configurations wherein the pixel electrode cutting pattern 166 and the common electrode cutting pattern 252 are omitted or variously modified.

Below, the second substrate 200 will be described in detail with reference to FIG. 3.

A black matrix 221 is formed on a second insulating substrate 211. In general, the black matrix 221 divides color filters 231 from one another, and blocks light directing toward the TFT provided on the first substrate 100. Exemplary embodiments of the black matrix 221 include a photosensitive organic material including a black pigment. Exemplary embodiments of the black pigment may include carbon black, titanium oxide, or other similar materials.

The color filter 231 may include red, green and blue filters which are repeatedly patterned using the black matrix 221 as a boundary therebetween. The color filter 231 colorizes the light emitted from a backlight unit (not shown) and passed through the liquid crystal layer 300. In one exemplary embodiment the color filter 231 may be made of a photosensitive organic material.

An overcoat layer 241 is formed on the color filter 231 and portion of the black matrix 221 which is exposed between the color filter 231. The overcoat layer 241 is employed for planarization of the color filter 231 and protects the color filter 231. In one exemplary embodiment the overcoat layer 241 may include a photosensitive acrylic resin.

A common electrode 251 is formed on the overcoat layer 241. In one exemplary embodiment the common electrode 251 is made of a transparent conductive material, exemplary embodiments of which include indium tin oxide ("ITO"), indium zinc oxide ("IZO"), or other similar materials. The common electrode 251 interacts with the pixel electrode 161 of the first substrate 100 to thereby directly apply voltage to the liquid crystal layer 300.

In the present exemplary embodiment the common electrode 251 is formed with the region partitioning member described above. In the present exemplary embodiment the region partitioning member includes a common electrode cutting pattern 252. The common electrode cutting pattern 252 together with the pixel electrode cutting pattern 166 divides the liquid crystal layer 300 into a plurality of regions.

The pixel electrode cutting pattern 166 and the common electrode cutting pattern 252 are not limited to this exemplary embodiment, and may have various shapes. In an alternative exemplary embodiment a projection may be provided instead of the cutting patterns 166 and/or 252 so as to divide the liquid crystal layer into a plurality of regions. In yet another exemplary embodiment the common electrode cutting pattern may be replaced with a protrusion while the pixel electrode includes a pixel electrode cutting pattern and vice versa.

Referring to FIG. 3, the liquid crystal layer 300 is placed between the first and the second substrates 100 and 200. In the present exemplary embodiment the liquid crystal layer 300 is a vertical aligned ("VA") mode in which liquid crystal molecules are aligned in a vertical direction if voltage is not applied thereto. When the voltage is applied to the liquid crystal molecules, the liquid crystal molecules are aligned in a direction perpendicular to the applied electric field because they have a negative dielectric anisotropy.

If the cutting patterns 166 and 252 are not formed, the liquid crystal molecules are oriented disorderedly in diverse directions because their directions of orientation are not determined. Furthermore, a demarcation line is formed on a boundary where the liquid crystal molecules differ in orientation. The cutting patterns 166 and 252 make a fringe field when the voltage is applied to the liquid crystal layer 300, and determine the orientation of the liquid crystal molecule alignment. Also, the liquid crystal layer 300 is divided into multiple regions according to dispositions of the cutting patterns 166 and 252.

The first exemplary embodiment of a liquid crystal display 1 according to the present invention has a black mode as a default mode wherein a voltage is not applied. The range of transmissivity of a VA mode LCD is about three times as large as a comparable twisted nematic ("TN") LCD.

Meanwhile, the first exemplary embodiment shows the LCD having a patterned vertical aligned ("PVA") mode. However, the present invention is not limited thereto.

Referring back to FIG. 1, the gate driver 410 is provided as a driving chip, and mounted on the flexible member 420. In the present exemplary embodiment the gate driver 410 is connected to the gate line 121 through an anisotropy conductive film (not shown) and a wiring line (not shown) formed on the flexible member 420.

In the present exemplary embodiment the gate driver 410 is provided at opposite sides of the display region, and the gate line 121 receives the gate signal from the gate driver 410 connected to opposite end parts thereof.

In the present exemplary embodiment the gate signal is generated by a timing controller 720 and a DC/DC converter 730. The generated gate signal is transmitted to the gate driver 410 through flexible members 810 and 520, a data circuit board 610 and a connecting wiring line (not shown) which is formed on the first insulating substrate 111.

Alternative exemplary embodiments include configurations wherein the gate driver 410 may be mounted on the first insulating substrate 111 in a chip-on-glass ("COG") type of mount.

The data driver 510 is provided as a driving chip and mounted on the flexible member 520. In one exemplary embodiment the data driver 510 is connected to the data line 141 through an anisotropy conductive film (not shown) and a connecting wiring line (not shown) formed on the flexible member 520.

The data driver 510 includes first through sixth data drivers 510a-f, respectively, and, in the present exemplary embodiment, the data driver 510 is arranged in a line along a top edge of the first substrate 100.

The data driver 510 includes data drivers 510c and 510d placed in the middle of the display region and distant from the gate driver 410, these data drivers will be referred to as "distant data drivers"; data drivers 510a and 510f placed in opposite sides of the display region and adjacent to the gate driver 410, these data drivers will be referred to as "adjacent data drivers"; and data drivers 510b and 510e placed between the distant data drivers 510c and 510d and the adjacent data drivers 510a and 510f, these data drivers will be referred to as "middle data drivers".

In the present exemplary embodiment the data circuit board 610 includes a first data circuit board 610a and a second data circuit board 610b. In the present exemplary embodiment each of the first and second data circuit boards 610a and 610b is connected to three data drivers 510. The data circuit board 610 supplies a control signal from a control circuit board 710 and power to the gate driver 410 and the data driver 510. Alternative exemplary embodiments include configurations wherein the first and second data circuit boards 610a and 610b may be connected to a greater or lesser number of data drivers 510.

The control circuit board 710 is connected to the first and second data circuit boards 610a and 610b. The timing controller 720 and the DC/DC converter 730 are mounted on the control circuit board 710. The timing controller 720 generates a control signal for driving the first substrate 100. The DC/DC converter 730 converts external input power into power needed for the first substrate 100 and the second substrate 200, e.g., the gate-on voltage, the gate-off voltage, the common voltage and the power source voltage AVDD.

Alternative exemplary embodiments include configurations wherein the control circuit board 710 may be integrated with various components of the LCD device 1 such as the data circuit board 610. In such an exemplary embodiment, the timing controller 720 and the DC/DC converter 730 may be mounted on the data circuit board 610.

In the first exemplary embodiment, the gate-on voltage is applied to both end parts of the gate line 121. The applied gate-on voltage is delayed by inherent resistance of the gate line 121.

Thus, the gate-on voltage is delayed by a relatively small amount in left and right parts of the display region close to the gate driver 410, e.g., those regions corresponding to the adjacent data drivers 510a and 510f. This is because the gate-on voltage passes through a relatively small length of the gate line 121 before reaching these adjacent areas, and therefore encounters only a small amount of resistance. On the other hand, the gate on voltage is delayed by a relatively large amount in a center part of the display region distant from the gate driver 410, e.g., those regions corresponding to the distant data drivers 510c and 510d. This is because the gate-on voltage passes through a relatively large length of the gate line 121 before reaching these distant areas, and therefore encounters an increased amount of resistance.

Figure 4:
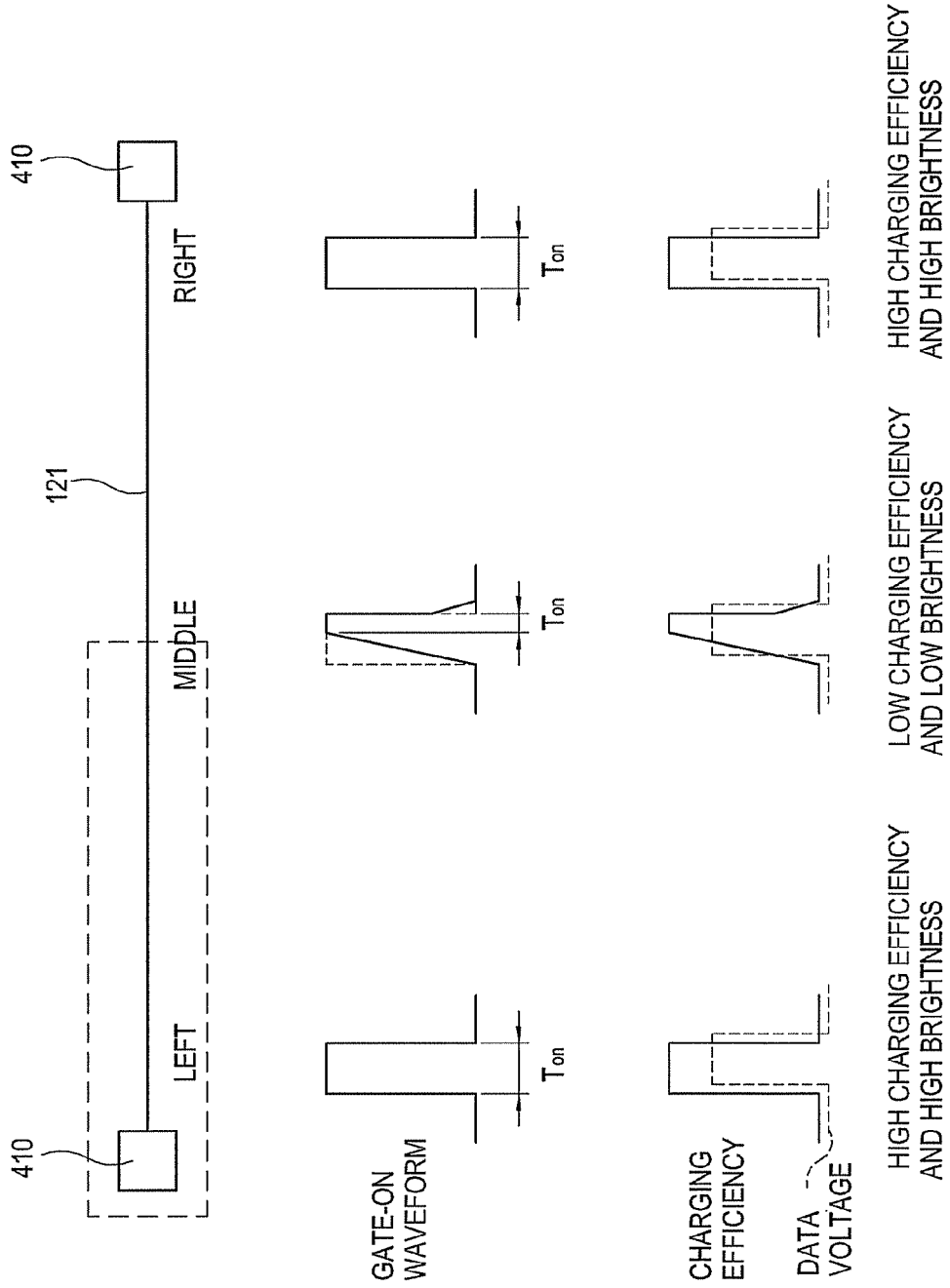
FIG. 4 illustrates non-uniform brightness due to delay of a gate signal.

Accordingly, the gate-on voltage which varies depending on distance from the gate driver 410 causes non-uniform brightness, which will be described in more detail with reference to FIG. 4.

The gate-on voltage applied to the gate line 121 disposed in the left and right parts of the display region, e.g., the region adjacent to the gate driver 410, is delayed by a relatively small amount. Therefore, these regions have a relatively long on-time duration Ton.

On the other hand, the gate-on voltage applied to the gate line 121 disposed in the center part of the display region, e.g., the region distant from the gate driver 410, is delayed by a relatively large amount. Therefore, these regions have a relatively short on-time duration Ton.

Even though the same data voltage may be applied, differences in the on-time duration cause the charging efficiency in the left and right parts of the display region to be higher than that in the center part. The closer to the left and right parts of the display region where the charging efficiency is relatively high, the higher the brightness becomes. The closer to the center part of the display region where the charging efficiency is relatively low, the lower the brightness becomes.

In the first exemplary embodiment, the power source voltage AVDD applied to the data driver 510 is adjusted to uniformize the brightness, which will be described with reference to FIGS. 5 through 8.

Figure 5:
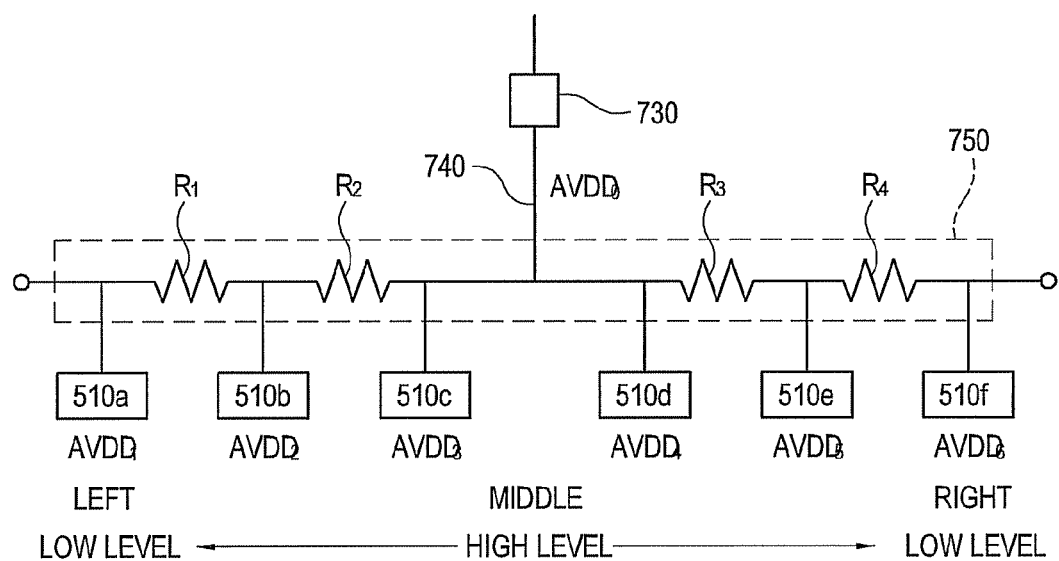
FIG. 5 is a schematic view illustrating the supply of a power source voltage in the first exemplary embodiment of an LCD device according to the present invention.

Referring to FIG. 5, a power source voltage supplying unit, which supplies the power source voltage, includes the DC/DC converter 730 (that is, the power source voltage generator), the wiring line 740 and a power source voltage adjuster. In the present exemplary embodiment the power source voltage adjustor 750 includes a resistor string 750.

The DC/DC converter 730 converts the external input power into an initial power source voltage AVDD0.

The initial power source voltage AVDD0 is applied to the resistor string 750 through the wiring line 740. The resistor string 750 includes a plurality of resistors R1 through R4. The initial power source voltage AVDD0 is lowered while passing through each of the resistors.

In the resistor string 750, the resistors R1 through R4 are connected in series. The initial power source voltage AVDD0 is supplied to the more distant data driver 510 after going through more resistors R1 through R4 as the distance from the center of the display region increases. In one exemplary embodiment the resistor string 750 may be surface-mounted on the data circuit board 610.

The resistor string 750 causes the power source voltage supplied to the respective data drivers 510 to have the highest level in the distant data drivers 510c and 510d and the lowest level in the adjacent data drivers 510a and 510f.

That is, the power source voltage having the high level is supplied to the distant data drivers 510c and 510d in which the gate signal is delayed by a relatively large amount, and the power source voltage having the low level is supplied to the adjacent data drivers 510a and 510f in which the gate signal is relatively un-delayed.

Figure 6:
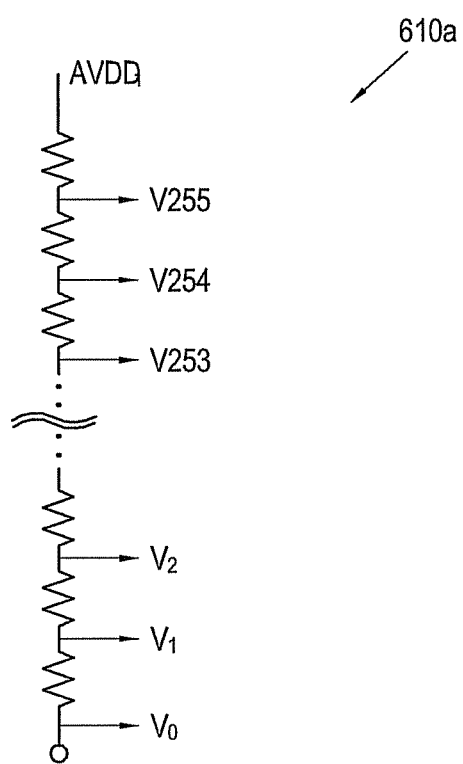
FIG. 6 is a schematic view illustrating the generation of a data voltage of a data driver in the first exemplary embodiment of an LCD device according to the present invention.

Referring to FIG. 6, the respective data drivers 510a through 510f generate the data voltage based on the input power source voltage.

FIG. 6 is a schematic view illustrating the generation of a data voltage of a data driver in the first exemplary embodiment of an LCD device according to the present invention. FIG. 6 illustrates the adjacent data driver 510a in which the data voltages V0 through V255 corresponding to 256 gray scales are generated from the supplied power source voltage AVDD1. Alternative exemplary embodiments include configurations wherein the number of gray scales may be increased or decreased.

Because the data voltage is derived from the power source voltage, the level of the data voltage depends on the level of the power source voltage. That is, if the input power source voltage has a high level, the data voltage also has a high level. On the other hand, if the input power source voltage has a low level, the data voltage also has a low level.

As described above, the power source voltages supplied to the respective data drivers 510a through 510f have different voltage levels from one another, and therefore the data voltages generated from the data drivers 510a through 510f are also different in the level from one another.

Figure 7:
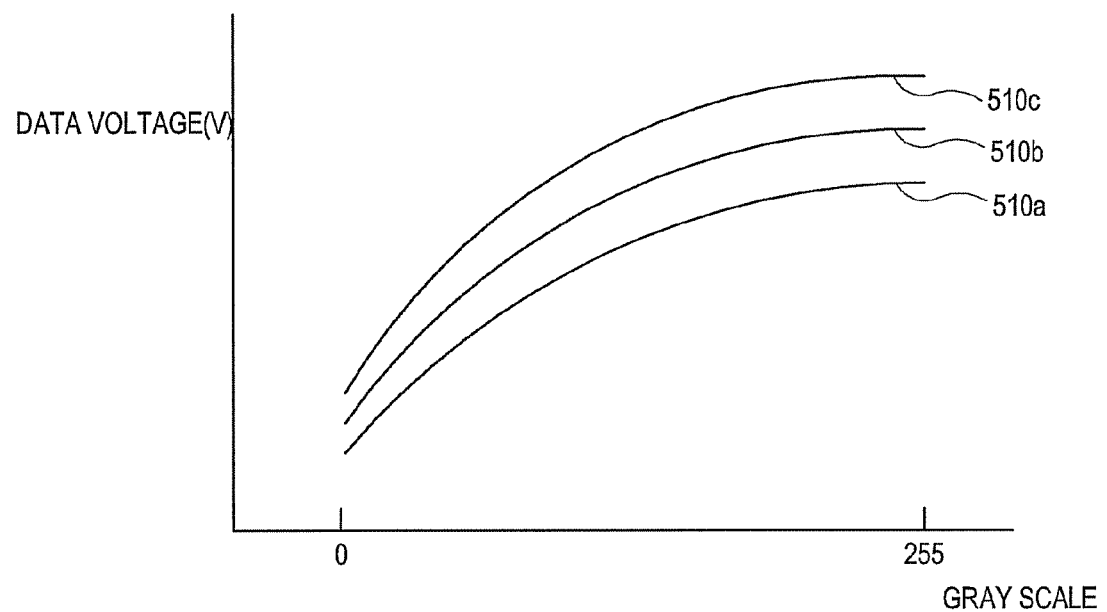
FIG. 7 is a graph of the data voltage against a gray scale in the first exemplary embodiment of an LCD device according to the present invention.

FIG. 7 is a graph of the data voltages against a gray scale in the first exemplary embodiment of an LCD device according to the present invention. FIG. 7 specifically shows the data voltages generated from the data drivers 510a, 510b and 510c.

Referring to FIG. 7, with regard to the data voltages for expressing the same gray scale, the distant data driver 510c placed in the center part of the display region has the higher data voltage than the adjacent data driver 510a placed in the left part of the display region.

At this time, the distant data driver 510c placed in the center part of the display region receives the higher power source voltage than the adjacent data driver 510a placed in the left part of the display region.

Figure 8:
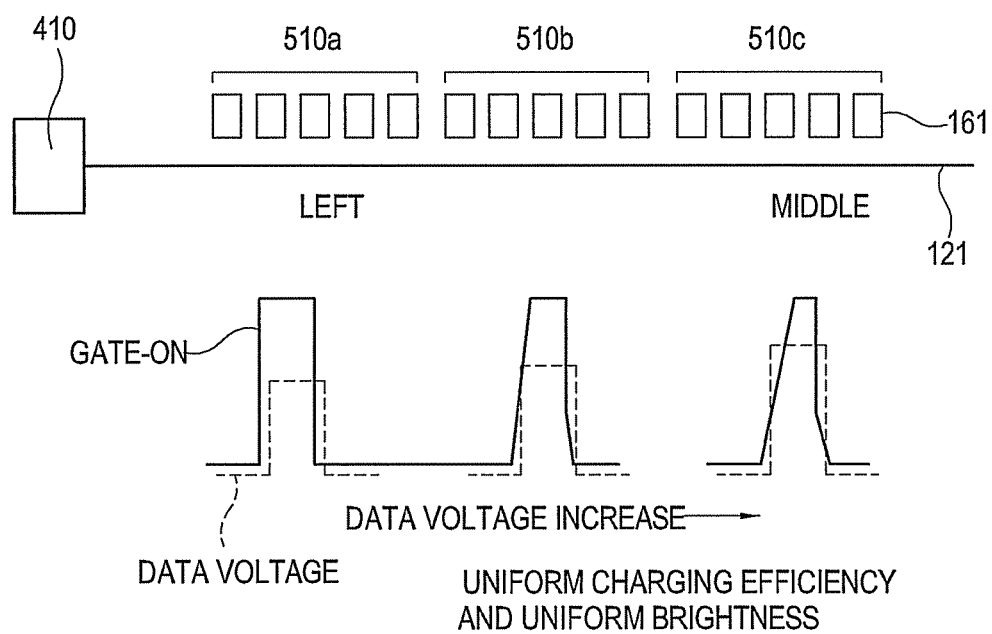
FIG. 8 is a schematic view illustrating an improvement in brightness uniformity in the first exemplary embodiment of an LCD device according to the present invention.

According to the present exemplary embodiment of the present invention, the data voltage applied to the center part of the display region is higher than that to the left and right parts. Thus, the uniformity of the brightness is enhanced, which will be described in more detail with reference to FIG. 8. For convenience, the gate line 121 corresponding to only three data drivers 510a, 510b and 510c are illustrated in FIG. 8.

The gate line 121 placed in the left part of the display region and corresponding to the adjacent data driver 510a has a relatively long on-time duration Ton but receives a relatively low data voltage. On the other hand, the gate line 121 placed in the center part of the display region and corresponding to the distant data driver 510c has a relatively short on-time duration Ton but receives a relatively high data voltage.

As a result, the difference between the on-time duration is compensated by the voltage level difference between the data voltages. The charging efficiency for the pixel is uniformized throughout the display region, and the uniform charging efficiency enhances the uniformity of the brightness of the LCD device 1.

The above described uniformity of brightness resulting from applying the different power source voltages to the data driver 510 was confirmed experimentally. The experiment will be described with reference to Table 1.

In the experiment, the brightness of the pixels at three points B1, B2 and B3, as shown in FIG. 1, was observed while changing the power source voltage applied thereto. In each case, the same power source voltage was applied to the data driver 510, and the brightness was sampled at a gray scale of 45.

The pixel at the point B1 receives the data voltage from the distant data driver 510c, the pixel at the point B2 receives the data voltage from the middle data driver 510b, and the pixel at the point B3 receives the data voltage from the adjacent data driver 510a. The brightness is measured in nits.

TABLE 1

| Power Source Voltage (V) | B1 | B2 | B3 |
| --- | --- | --- | --- |
| 14.0 | 2.00 | 2.37 | 5.36 |
| 14.2 | 2.41 | 2.92 | 6.57 |
| 14.6 | 4.71 | 5.33 | 9.91 |
| 14.8 | 5.31 | 6.21 | 10.77 |
| 15.0 | 7.61 | 8.66 | 13.66 |

Referring to Table 1, under the same power source voltage, the brightness varies greatly according to position of the pixel. That is, when the same power source voltage is supplied to the data driver 510 and the same data voltage is applied to the pixels, the brightness is not uniform.

Referring to Table 1, when the power source voltage increases, the brightness increases. In other words, if the data voltage increases, the brightness will increase as well.

From Table 1, it is appreciated that the brightness can be uniformized by changing the power source voltage input to the various data drivers depending on their positioning within the LCD device 1. For example, to give the brightness of 5.36 nit to the left part B3 of the display region at 45 gray scale and to give similar brightness to the other parts of the display region, the power source voltage may be varied as can be seen in Table 2.

TABLE 2

|  | B1 | B2 | B3 |
|---|---|---|---|
| Power Source voltage (V) | 14.8 | 14.6 | 14.0 |
| Brightness (nit) | 5.31 | 5.33 | 5.36 |

According to Table 2, the power source voltage of 14.8 V is applied to the distant data driver 510c, the power source voltage of 14.6V is applied to the middle data driver 510b, and the power source voltage of 14V is applied to the distant data driver 510a, in which the resistance of the power source voltage adjuster 750 is adjusted according to the determined power source voltages.

As shown in the experimental results, the uniformity of the brightness can be enhanced by adjusting the power source voltage applied to the data drivers 510a through 510f.

Figure 9:
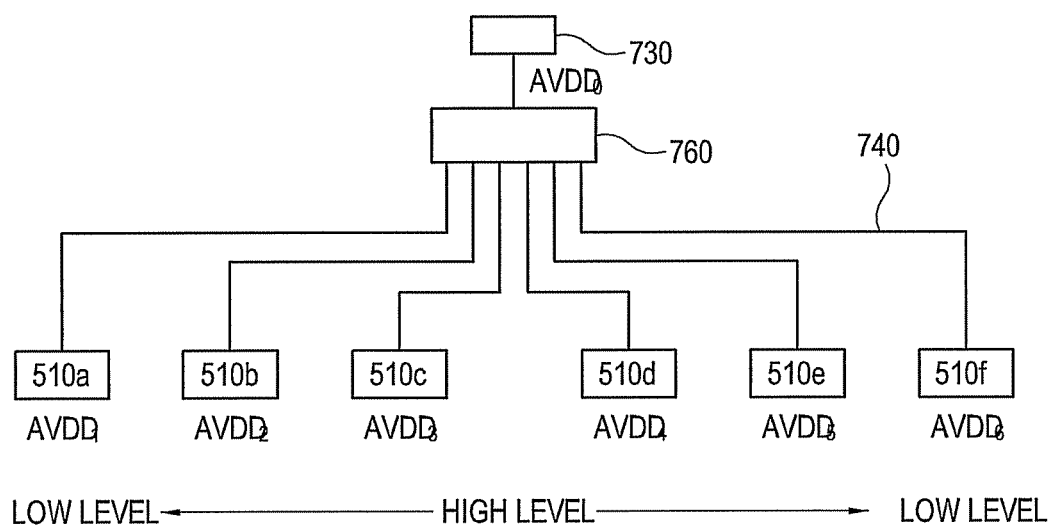
FIG. 9 is a schematic view illustrating the supply of a power source voltage in a second exemplary embodiment of an LCD device according to the present invention.

A second exemplary embodiment of an LCD device according to the present invention will be described with reference to FIG. 9.

Similar to the first exemplary embodiment, the second exemplary embodiment includes a power source voltage supplying unit 910 including a DC/DC converter, a wiring line 740 and a power source voltage adjuster. In the present exemplary embodiment the power source voltage adjuster includes an integrated circuit 760. In one exemplary embodiment the integrated circuit 760 may be mounted on the data circuit board 610.

An initial power source voltage AVDD0 generated from the DC/DC converter 730 is supplied to data drivers 510a through 510f via the integrated circuit 760. The supplied power source voltages AVDD1 through AVDD6 decrease in voltage level as they are applied outwards from the center of the display, similar to the first exemplary embodiment.

A third exemplary embodiment of an LCD device according to the present invention will be described with reference to FIGS. 10 and 11.

Figure 10:
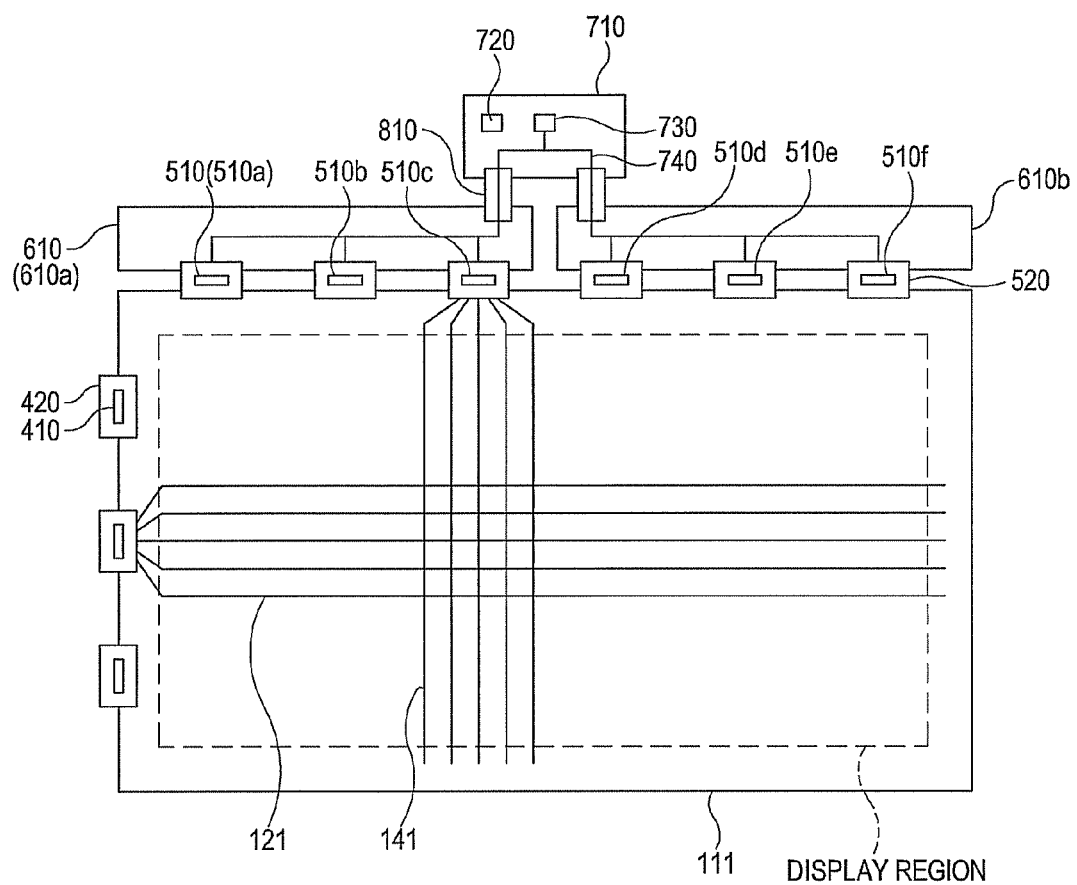
FIG. 10 is a top plan view layout of a third exemplary embodiment of an LCD device according to the present invention.

Referring to FIG. 10, in the third exemplary embodiment a gate driver 410 is placed only on a left side of the display region. Thus, the gate-on voltage is increasingly delayed, and therefore the on-time duration Ton is increasingly shortened, with distance towards a right part of the display region.

Figure 11:
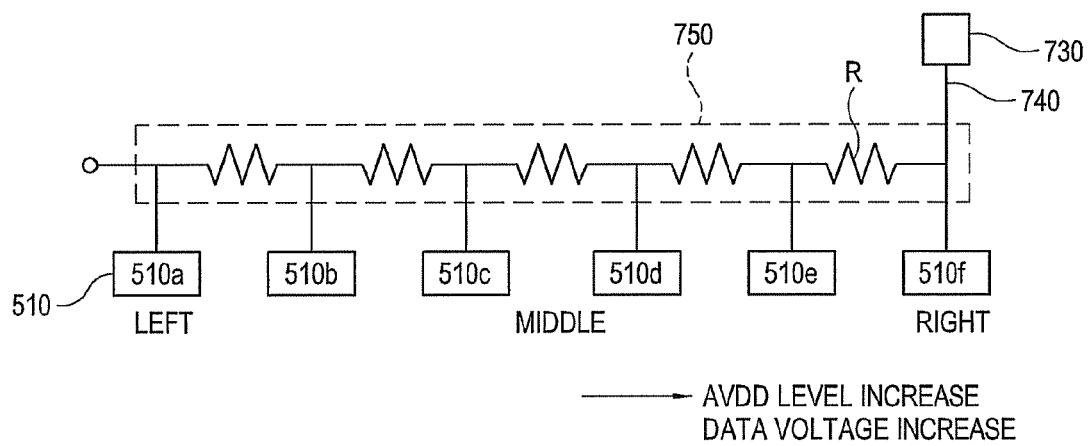
FIG. 11 is a schematic view illustrating the supply of a power source voltage in a fourth exemplary embodiment of an LCD device according to the present invention.

Referring to FIG. 11, a resistor string 750 has resistance configured so that the supplied power source voltage increases going from the left part to the right part of the display region. In other words, the higher power source voltage is applied farther away from the gate driver 410.

Thus, the higher data voltage is applied farther away from the gate driver 410, and decreases of the gate-on voltage (Ton) are compensated by increases of the data voltage.

Figure 12:
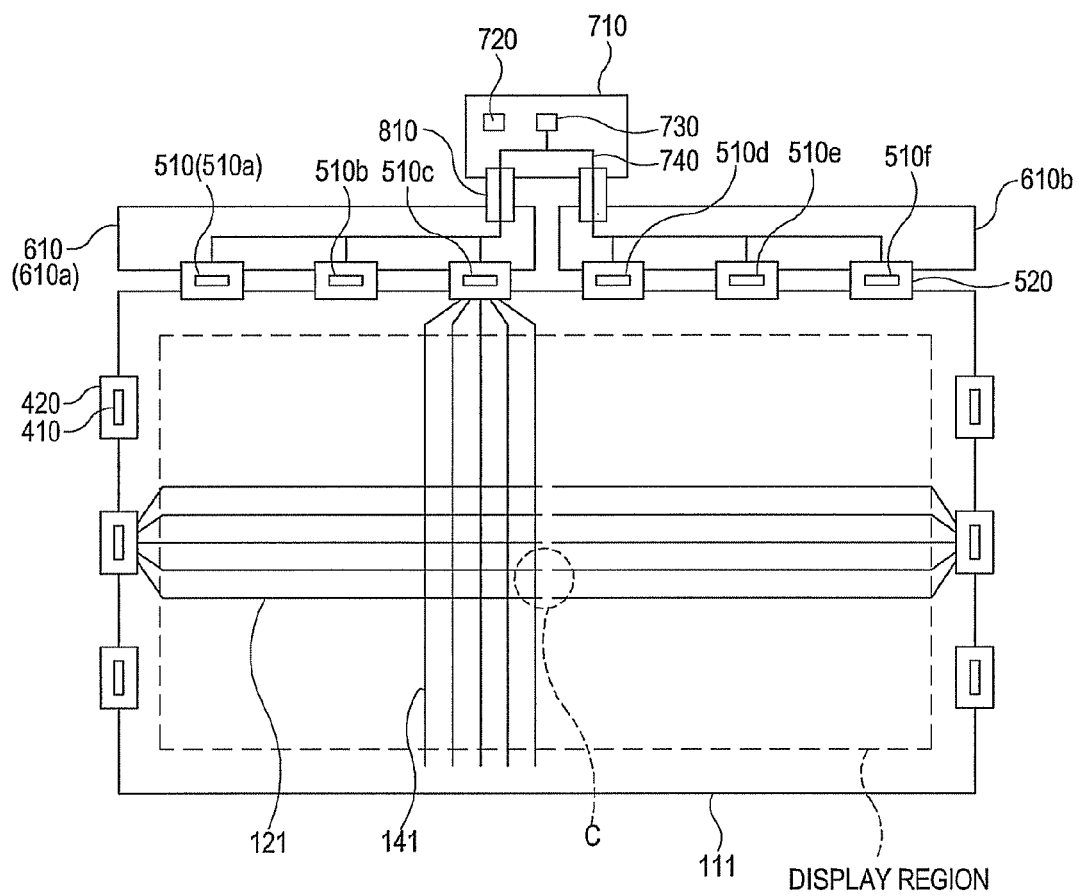
FIG. 12 is a top plan view layout of a fifth exemplary embodiment of an LCD device according to the present invention.

A fourth exemplary embodiment of an LCD device according to the present invention will be described with reference to FIG. 12.

In the present exemplary embodiment the gate drivers 410 are placed at opposite sides of the display region similar to the first exemplary embodiment. In the present exemplary embodiment the gate line 121 connected to the left gate driver 410 and the gate line 121 connected to the right gate driver 410 are disconnected from each other (see region "C" in FIG. 12).

In the fourth exemplary embodiment, similar to the first exemplary embodiment, the greatest decrease in the on-time duration (Ton) occurs in the center part of the display region, but the non-uniformity of the brightness can be reduced by applying the power source voltage with different levels.

Figure 13:
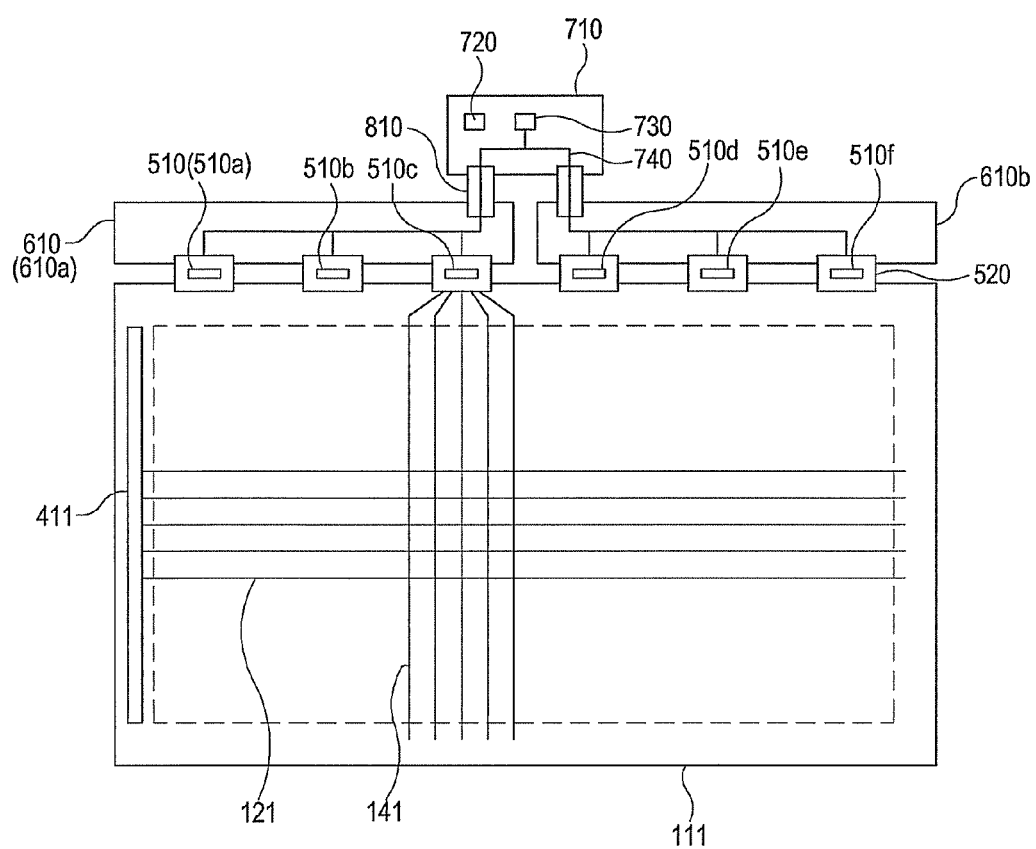
FIG. 13 is a top plan view layout of a sixth exemplary embodiment of an LCD device according to the present invention.

A fifth exemplary embodiment of an LCD device according to the present invention will be described with reference to FIG. 13.

In the fifth exemplary embodiment, a gate driver 411 is directly mounted on a first insulating substrate 111. Here, the gate driver 411 is formed at substantially the same time when display devices, such as the thin film transistor are formed in the display region.

In the present exemplary embodiment the gate driver 411 is placed only in a left side of the display region. Thus, the gate-on voltage is increasingly delayed and the on-time duration Ton is increasingly shortened with distance towards a right part of the display region, but the non-uniformity of the brightness can be reduced by applying the power source voltage with different levels.

As described above, the present invention provides a liquid crystal display device in which non-uniformity of brightness due to delay of a gate signal is reduced.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display device comprising:
   gate lines disposed on a display region;
   data lines disposed on the display region, the data lines intersect with, and are insulated from, the gate lines;
   a gate driver which drives the gate lines;
   a plurality of data drivers which generate a data voltage from an input power source voltage and supply the data voltage to the data lines; and
   a power source voltage supplying unit which supplies different power source voltages to each individual data driver according to a distance of each data driver from the gate driver,
   wherein the power source voltage supplying unit comprises:
      a power source voltage generator which generates an initial power source voltage, which is a constant direct current voltage regardless of image information to be displayed, based on an external input power; and
      a power source voltage adjuster which is disposed between the power source voltage generator and the plurality of data drivers and disposed between each of the plurality of data drivers, the power source voltage adjuster adjusting the initial power source voltage to generate the different power source voltages to be applied to the plurality of data drivers,
   wherein the power source voltage adjuster comprises a resistor string.

2. The liquid crystal display device according to claim 1, wherein the voltage level of the power source voltage applied to the individual data drivers increases as the individual data drivers are disposed at an increasing distance from the gate driver.

3. The liquid crystal display device according to claim 1, wherein the gate driver includes a first gate driver and a second gate driver, and the first and second gate drivers are disposed on substantially opposite sides of the display region.

4. A liquid crystal display device comprising:
a first substrate which comprises:
gate lines disposed on a display region; and
data lines disposed on the display region,
wherein the data lines intersect with, and are insulated from, the gate lines;
a second substrate disposed substantially opposite to the first substrate;
a liquid crystal layer disposed between the first substrate and the second substrate;
a gate driver which drives the gate lines;
a plurality of data drivers including;
a first data driver disposed a first distance away from the gate driver; and
a second data driver disposed a second distance away from the gate driver,
wherein the second distance is larger than the first distance; and
a power source voltage supplying unit which supplies different power source voltages to the first data driver and the second data driver,
wherein the power source voltage supplying unit comprises:
a power source voltage generator which generates an initial power source voltage, which is a constant direct current voltage regardless of an image to be displayed, based on an external input power; and
a power source voltage adjuster which adjusts the initial power source voltage to generate the different power source voltages to be applied to the first data driver and the second data driver, respectively, and disposed between the power source voltage generator and the plurality of data drivers and disposed between each of the plurality of data drivers, and
wherein the power source voltage adjuster comprises a resistor string.

5. The liquid crystal display device according to claim 4, wherein the power source voltage supplying unit supplies the second data driver with a greater power source voltage than the first data driver.

6. The liquid crystal display device according to claim 4, wherein the power source voltage adjuster is disposed between the power source voltage generator and the data driver.

7. The liquid crystal display device according to claim 4, wherein the power source voltage adjuster comprises a resistor string.

8. The liquid crystal display device according to claim 4, wherein the liquid crystal layer is a vertical alignment mode liquid crystal layer.

9. The liquid crystal display device according to claim 8, wherein
the first substrate further comprises a pixel electrode including a first region partitioning member, and
the second substrate comprises a common electrode including a second region partitioning member.

10. The liquid crystal display device according to claim 9, wherein the first region partitioning member includes a pixel electrode cutting pattern and the second region partitioning member includes a common electrode cutting pattern.

11. The liquid crystal display device according to claim 4, wherein the gate driver is formed on the first substrate.

12. The liquid crystal display device according to claim 4, the gate driver includes a first gate driver and a second gate driver, and the first and second gate drivers are disposed on substantially opposite sides of the display region.

13. A method of driving a liquid crystal display device, the method comprising:
generating an initial power source voltage, which is a constant direct current voltage regardless of an image to be displayed, based on an external input power;
adjusting the initial power source voltage to generate different power source voltages;
supplying the different power source voltages to a plurality of data drivers, each of the plurality of data drivers electrically connected to an adjacent data driver of the plurality of data drivers, wherein the power source voltages differ according to a distance of a corresponding data driver is from a gate driver; and
generating a data voltage from the power source voltage input to each data driver; and
applying the data voltage to a data line from the corresponding data driver,
wherein the adjusting the initial power source voltage is performed with a power source voltage adjuster disposed between each of the plurality of data drivers, the power source voltage adjuster adjusting the initial power source voltage to generate the different power source voltages to be applied to the plurality of data drivers, and
wherein the power source voltage adjuster comprises a resistor string.

14. The method according to claim 13, wherein the voltage level of the power source voltage applied to individual data drivers of the plurality of data drivers increases as those individual data drivers are disposed at an increasing distance from the gate driver.

* * * * *